(12) United States Patent
Kim et al.

(10) Patent No.: US 12,541,932 B2
(45) Date of Patent: Feb. 3, 2026

(54) METHOD OF CALCULATING HIGH-RESOLUTION 3D WIND NUMERICAL INFORMATION CONSIDERING DETAILED TOPOGRAPHIC INFORMATION

(71) Applicant: National Institute of Meteorological Sciences, Seogwipo-si (KR)

(72) Inventors: Yeon-Hee Kim, Seogwipo-si (KR); Sang-Hyun Lee, Sejong-si (KR); Hyeong-Se Jeong, Seogwipo-si (KR); Hee-Wook Choi, Seogwipo-si (KR); Doo-Il Lee, Namyangju-si (KR)

(73) Assignee: National Institute of Meteorological Sciences, Seogwipo-si (KR)

( * ) Notice: Subject to any disclaimer, the term of this patent is extended or adjusted under 35 U.S.C. 154(b) by 420 days.

(21) Appl. No.: 18/174,037

(22) Filed: Feb. 24, 2023

(65) Prior Publication Data
US 2023/0274520 A1    Aug. 31, 2023

(30) Foreign Application Priority Data
Feb. 25, 2022    (KR) .................. 10-2022-0025300

(51) Int. Cl.
   *G06T 19/20*    (2011.01)
(52) U.S. Cl.
   CPC ...... *G06T 19/20* (2013.01); *G06T 2219/2016* (2013.01)

(58) Field of Classification Search
CPC .. G01W 1/10; G06T 19/20; G06T 2219/2016; Y02A 90/10
See application file for complete search history.

(56) References Cited

U.S. PATENT DOCUMENTS

| | | | |
|---|---|---|---|
| 8,930,299 B2* | 1/2015 | Pyle | G01W 1/10 706/52 |
| 9,230,219 B2* | 1/2016 | Fang | G01W 1/10 |
| 11,408,399 B2* | 8/2022 | Bai | F03D 17/00 |

OTHER PUBLICATIONS

Beljaars, A.C.M. et al., "A new parametrization of turbulent orographic form drag." Q. J. R. Meteorol. Soc., 130, Apr. 2004, pp. 1327-1347.

(Continued)

*Primary Examiner* — An H Do
(74) *Attorney, Agent, or Firm* — Rabin & Berdo, P.C.

(57) ABSTRACT

Provided is a method of calculating high-resolution three-dimensional wind numerical information considering detailed topographic information, the method performing, when the wind numerical data of the operational LDAPS model is calculated (S100), a downscaling process based on the detailed topographic information using the wind numerical data as an input data, wherein the downscaling process performs a preprocessing process of converting a coordinate system and interpolating horizontal and vertical numerical data (S200), performs a process of adjusting roughness lengths (S300), correcting heights (S400), and correcting a subgrid-scale terrain drag effect (S500) on the basis of the detailed topographic information, and finally generating data that has gone through each of the processes as high-resolution wind numerical data (S600).

9 Claims, 1 Drawing Sheet

(56) References Cited

OTHER PUBLICATIONS

Borge, R. et al., "A comprehensive sensitivity analysis of the WRF model for air quality applications over the Iberian Peninsula." Atmospheric Environment, 42, Dec. 2008, pp. 8560-8574.

Chandrasekar, V. et al., "Deployment and performance of the NASA D3R During the Ice-Pop 2018 Field Campaign in South Korea." IGARSS 2018—2018 IEEE International Geoscience and Remote Sensing Symposium, Jul. 22-27, 2018, pp. 8349-8351.

Howard, T., and Clack, P., "Correction and downscaling of NWP wind speed forecasts." Meteorol. Appl. 14, Jun. 11, 2007, pp. 105-116.

Lee, S.-H., and Park, S.-U., "A vegetated urban canopy model for meteorological and environmental modelling." Bound.—Layer Meteor., 126, Aug. 15, 2008, pp. 73-102.

Lee, S.-H., "Further development of the vegetated urban canopy model including a grass-covered surface." Bound.—Layer Meteor., 140, Apr. 21, 2011, pp. 315-342, doi:10.1007/s10546-011-9603-7.

Lott, F., and M. J. Miller, "A new subgrid-scale orographic drag parametrization: Its formulation and testing." Q. J. R. Meteorol. Soc., 123, Jan. 1997, pp. 101-127.

Palmer, T. N., "Predicting uncertainty in numerical weather forecasts." Int. Geophys., 83, 2002, pp. 3-13.

Pelland, S et al., "Solar and photovoltaic forecasting through post-processing of the Global Environmental Multiscale numerical weather prediction model." Prog. Photovoltaics. Res. Appl., 21, May 2013, pp. 284-296, doi:10.1002/pip.1180.

Seok, J.-H. et al., "Diagnosis of low-level aviation turbulence using the Korea Meteorological Administration Post Processing (KMAPP)." J. Korean Soc. Aviat. Aeronaut., 28, Dec. 31, 2020, pp. 1-11, doi: 0.12985/ksaa.2020.28.4.001.

Sheridan, P. et al., "A simple height-based correction for temperature downscaling in complex terrain." Meteor. Appl., 17, Feb. 12, 2010, pp. 329-339, doi: 10.1002/met.177.

Sheridan, P. et al., "A physically based algorithm for downscaling temperature in complex terrain. J. Appl." Meteor. Climatol., 57, Aug. 2018, pp. 1907-1929, doi:10.1175/JAMC-D-17-0140.1.

Yun, J. et al., "Analyses of the meteorological characteristics over South Korea for wind power applications using KMAPP." Atmosphere, 31, Mar. 31, 2021, pp. 1-15.

* cited by examiner

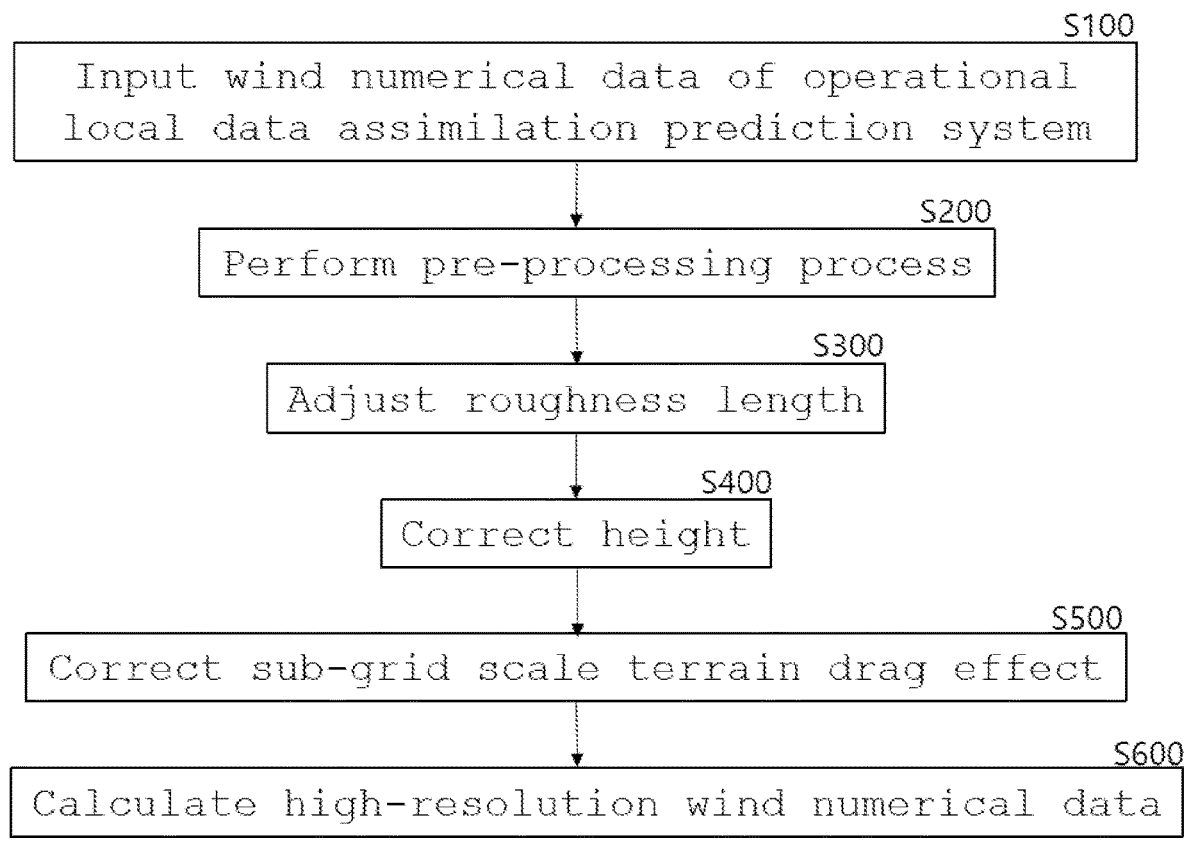

METHOD OF CALCULATING HIGH-RESOLUTION 3D WIND NUMERICAL INFORMATION CONSIDERING DETAILED TOPOGRAPHIC INFORMATION

TECHNICAL FIELD

The present invention relates to a method of calculating high-resolution three-dimensional wind numerical information considering detailed topographic information, and more particularly, to a method of calculating high-resolution three-dimensional wind numerical information considering detailed topographic information, in which when wind numerical data of an operational local data assimilation prediction system (LDAPS) is calculated, a downscaling process based on the detailed topographic information is performed using the wind numerical data as an input data, and here, the downscaling process performs a preprocessing process of converting the coordinate system and interpolating horizontal and vertical numerical data, performs a process of adjusting roughness length, correcting height, and correcting a subgrid-scale terrain drag effect on the basis of the detailed topographic information, and finally generates the data that has gone through each of the processes as high-resolution wind numerical data.

BACKGROUND ART

High-resolution weather prediction information is base information widely used in various social and economic sectors, and demands for generation of accurate weather prediction information are continuously increasing (e.g., Pelland et al., 2013; Sheridan et al., 2018; Seok et al., 2020). A weather numerical model is a tool widely used to generate predicted weather information, and various types of weather numerical models are used for research purposes on the meteorological phenomena or for operational purposes for providing meteorological information. Although the weather numerical models are generally based on a deterministic atmospheric motion governing equation, they have various uncertainty factors such as initial and boundary conditions, numerical difference methods, and physical process parameterization (e.g., Palmer, 2000), and the predicted weather information inevitably includes errors. Although various studies are conducted to improve the weather numerical models (e.g., Lott and Miller, 1997; Beljaars et al., 2004; Lee and Park, 2008; Lee et al., 2011), prediction errors of the models are regarded as unavoidable factors. Therefore, prediction information of the weather numerical models goes through post-processing by using various methods to meet the purpose of use (e.g., Howard and Clark, 2007; Sheridan et al., 2010; Pelland et al., 2013; Sheridan et al., 2018).

The Korea Meteorological Administration Post Processing (KMAPP) model system of the National Institute of Meteorological Sciences generates high-resolution meteorological information of 100 m grid resolution for the entire Korean Peninsula using local meteorological field prediction information (1.5 km grid resolution) of the Local Data Assimilation and Prediction System (LDAPS) of the Korea Meteorological Administration. The KMAPP model is based on the United Kingdom Post Processing (UKPP), which is a downscaling model developed by the United Kingdom Meteorological Administration Met Office to increase utilization of numerical prediction information of the Unified Model (UM) and to be used for ultra-short-term operational prediction. It is a method of generating detailed spatial-scale meteorological factors by reflecting the influence of subgrid-scale terrain and land surface information, which cannot be expressed in operational prediction models, to a prediction result. Currently, the KMAPP system generates prediction information of solar radiation, temperature, and wind speed periodically four times a day according to the prediction period of the local prediction model of the Korea Meteorological Administration. This information is used for meteorological support in the fields of renewable energy, such as solar and wind energy or the like, and provides high-resolution ground information in various fields, such as providing aeronautical weather information around airports (Seok et al., 2020; Yun et al., 2021). In addition, the model prediction system is continuously verified to improve reliability of predicted weather information of the KMAPP model.

International Collaborative Experiment for Pyeongchang Olympic and Paralympics (ICE-POP) is an international collaborative research program conducted to support the Pyeongchang Winter Olympic Games held in February 2018, and twenty-eight institutions in twelve countries around the world have conducted intensive observations and numerical modeling on the local weather targeting the Pyeongchang region (e.g., Chandrasekar et al., 2018; In et al., 2018; Jung et al., 2020). On-site and remote measurement devices of various platforms, such as surface automatic weather stations (AWS), radiosondes, precipitation/wind LiDAR, and the like, are deployed and operated in major areas, and numerical prediction data are generated from the models of various organizations, including the operational LDAPS model. Weather information for the operation of the Winter Olympic Games is supported on the basis of this information. In addition to this, various scientific research topics related to complex topographic areas, such as changes in the three-dimensional wind structures of the atmospheric boundary layer due to mountainous topographic areas, analysis of snowfall mechanisms through ocean-atmosphere interactions, and the like, are also presented as the goals. The special measurement data for the ICE-POP 2018 campaign are collected from complex topographic areas including mountains and oceans, and provide good information for evaluating prediction performance of the numerical models, as well as meteorological phenomenon studies, in the complex topographic areas.

Non-Patent Documents

Beljaars, A. C. M., A. R. Brown, and N. Wood, 2004: A new parametrization of turbulent orographic form drag. Quarterly Journal of the Royal Meteorological Society, 130, 1327-1347.

Borge, R., V. Alexandrov, J. Jos del Vas, J. Lumbreras, and E. Rodr guez, 2008: A comprehensive sensitivity analysis of the WRF model for air quality applications over the Iberian Peninsula. Atmospheric Environment, 42, 8560-8574.

Chandrasekar, V., M. A. Vega, S. Joshil, M. Kumar, D. Wolff, and W. Petersen, 2018: Deployment and performance of the NASA D3R During the Ice-Pop 2018 Field Campaign in South Korea. IGARSS 2018-2018 IEEE International Geoscience and Remote Sensing Symposium, 8349-8351.

DISCLOSURE OF INVENTION

Technical Problem

Therefore, the present invention has been made in view of the above problems, and it is an object of the present invention to provide a method of calculating high-resolution three-dimensional wind numerical information considering detailed topographic information, which can generate high-resolution wind numerical data as wind numerical data of an operational LDAPS model.

Technical Solution

To accomplish the above object, according to one aspect of the present invention, there is provided a method of calculating high-resolution three-dimensional wind numerical information considering detailed topographic information, in which when wind numerical data of an operational LDAPS model is calculated, a downscaling process based on the detailed topographic information is performed using the wind numerical data as an input data, and here, the downscaling process
  performs a preprocessing process of converting the coordinate system and interpolating horizontal and vertical numerical data,
  adjusts roughness lengths and corrects heights on the basis of the detailed topographic information, performs a process of correcting the sub-grid scale terrain drag effect, and finally generates the data that has gone through each of the processes as high-resolution wind numerical data.

Advantageous Effects

The present invention has an effect of generating high-resolution wind numerical data as wind numerical data of an operational LDAPS model.

The present invention clearly shows a tendency of over-simulation of surface wind speed in mountain areas, especially in valley areas, and has an effect of reducing excessively simulated wind speed through physical correction (roughness adjustment and height correction)

The present invention has an effect of showing a good performance as a result of predicting surface wind speed in a mountain area, clearly showing the topographic smoothing effect in a mountainous topographic area through the surface wind speed prediction error of the LDAPS model in a complex topographic area, and showing remarkable improvement in the prediction performance around the point where the surface wind speed is excessively simulated by LDAPS.

BRIEF DESCRIPTION OF THE DRAWINGS

The FIGURE is a flowchart for calculating high-resolution wind numerical information considering detailed topographic information according to an embodiment of the present invention.

BEST MODE FOR CARRYING OUT THE INVENTION

A preferred embodiment of a method of calculating high-resolution three-dimensional wind numerical information considering detailed topographic information according to the present invention will be described with reference to the drawings, and a plurality of examples thereof may exist, and such embodiments are for better understanding of the objects, features, and advantages of the present invention.

A method of calculating high-resolution three-dimensional wind numerical information considering detailed topographic information according to the present invention will be described.

The FIGURE is a flowchart illustrating a correction process of a high-resolution wind numerical data calculation system.

A system that implements high-resolution wind correction according to an embodiment of the present invention is a system based on wind numerical data of an operational LDAPS model. Here, the wind numerical data is defined as U wind and V wind expressed in the form of a two-dimensional vector. In the process of performing a method of calculating high-resolution wind numerical information considering detailed topographic information, when the wind numerical data of the operational LDAPS model is calculated (S100), a downscaling process based on the detailed topographic information is performed using the wind numerical data as an input data. Here, the downscaling process performs a preprocessing process of converting the coordinate system and interpolating horizontal and vertical numerical data (S200), and then performs a process of adjusting roughness lengths (S300), correcting heights (S400), and correcting a subgrid-scale terrain drag effect (S500) on the basis of the detailed topographic information. Data that have gone through each of the processes is finally generated as high-resolution wind numerical data (S600).

The 'method of calculating high-resolution wind numerical information considering detailed topographic information' is constructed using FORTRAN and Korn-shell languages based on an x86 Linux server.

The detailed components of the wind numerical data correction method based on the operational LDAPS model are described.

First, input of the wind numerical data of the operational LDAPS model (S100) is targeting numerical data of 1.5 km grid size generated in a pp format, and the execution process is largely configured of recognition of files produced according to prediction time of corresponding data, and input of related files.

The input data goes through a pre-processing process (S200). In this process, interpolation is performed horizontally and vertically after the coordinate system of the U wind and V wind fields of the operational LDAPS model is converted into an Arakawa-B grid. The horizontal interpolation process applies a distance-weighted bi-linear interpolation using a 2×2 operational LDAPS model including a target point, and the vertical interpolation process performs interpolation by applying a distance weight in the vertical direction in the same way as the horizontal interpolation. The wind data calculated in this way is configured as a 6,750×6,900 grid of 100 m in size for the South Korean area in the horizontal direction, and is configured of twenty height layers of 2.5 m to 1,000 m above the ground in the vertical direction.

In the roughness length adjustment (S300), wind data is corrected by applying the vegetation roughness length calculated based on the detailed topographic information. Correction of the vegetation roughness length is performed through a formula as shown in Equation (a).

$$u_{RA}(z) = \frac{u_*}{k}\ln\left(\frac{z}{z_0}\right) = u(h_{RA})\frac{\ln(z/z_0)}{\ln(h_{RA}/z_0)} \quad \text{Equation (a)}$$

Here, $u_{RA}(z)$ means wind data that has gone through roughness adjustment at vertical height z, $u^*$ is friction velocity, and k is von Karman constant (0.4). z is the height at which wind correction is performed, and $Z_0$ means a vegetation roughness length at a corresponding point. $u(h_{RA})$ denotes wind data of input data (operational LDAPS model), and $h_{RA}$ is a reference height for roughness adjustment, which means the upper end of vertical logarithmic distribution of wind.

Height correction (S400) is a process of correcting changes in wind generated due to a difference between the height of a model that generates the wind field and the actual height, and is performed on the basis of the linear theory assuming a neutral atmosphere on a terrain calculated at a high resolution. The process is defined as shown in equation (b).

$$\Delta u_{HC}(z) = u(h_{HC}) e^{-\kappa z} \Delta H \qquad \text{Equation (b)}$$

Here, $\Delta u_{HC}(z)$ means corrected wind data at vertical height z, and $u(h_{HC})$ means wind of input data (operational LDAPS model) at the reference height $h_{HC}$ for height correction. In addition, k is the topographic wave number, and $\Delta H_{HC}$ denotes height difference between high-resolution topographic data and low-resolution topographic data at the same target point. The reference height $h_{HC}$ for height correction and the topographic wave number k input into equation (b) are defined as shown in equations (c) and (d), respectively.

$$h_{HC} = \frac{1}{k} \qquad \text{Equation (c)}$$

$$k = \pi \frac{A/S}{H/2} \qquad \text{Equation (d)}$$

Here, H/2 and A/S mean the topographic peak height and topographic silhouette roughness length calculated from the high-resolution topographic data.

Correction of the effect of subgrid-scale terrain drag (S500) is a method of correcting vertical wind numerical data, and the procedure is configured of calculating a sub-grid-scale topographic roughness length, estimating attenuation of momentum using logarithmic wind distribution, and correcting the estimated attenuation of momentum. The sub-grid scale topographic roughness length is calculated considering high-resolution topographic height numerical data on the basis of a low-resolution grid size. In addition, the subgrid-scale topographic roughness length applies the roughness length relational formula calculated using a large eddy simulation model under ideal surface roughness conditions, and it is defined as shown in Equation (e).

$$z_{0,sso} = \alpha \sigma_h (1 + S_k)^\beta \qquad \text{Equation (e)}$$

Here, $\sigma_h$ and $S_k$ denote the standard deviation and skewness of the sub-grid scale topographic height, respectively, and $\alpha$ and $\beta$ are constants obtained through a large eddy simulation.

The attenuation of momentum generated due to sub-grid scale topographic roughness is estimated by applying the logarithmic wind speed distribution applied in the vegetation roughness correction, and it is defined as follows.

$$f_D(z) = \frac{\Delta \bar{u}(z)}{\bar{u}(z)} = \frac{\ln(h_{ABL}/z_0)\ln(z/z_{0,local})}{\ln(h_{ABL}/z_{0,local})\ln(z/z_0)} \qquad \text{Equation (f)}$$

$f_D(z)$ denotes the momentum attenuation rate at each height, and $\bar{u}(z)$ means wind data at vertical height z at which vegetation roughness correction is performed. $\Delta \bar{u}(z)$ denotes the difference of logarithmic wind data applying vegetation roughness length and sub-grid scale topographic roughness. $z_{0,local}$ is calculated by the sum of the vegetation roughness length and the sub-grid scale topographic roughness, and means ground surface roughness of the wind data correction point. $h_{ABL}$ means the height of the atmospheric boundary layer, and in the present invention, it is set as $3.5h_{ref}$ to reflect local topographic characteristics.

Finally, vertical wind distribution $\bar{u}_{sso}(z)$ applied with the sub-grid scale terrain drag effect may be calculated as shown in equation (g).

$$\bar{u}_{sso}(z) = \bar{u}(z)(1 - f_D(z)) \qquad \text{Equation (g)}$$

Calculation of high-resolution wind numerical data (S600) is performed to generate the high-resolution wind numerical data to be divided into Netcdf4 format files in a set directory for each prediction time, and variables generated in each file include U wind, V wind, and wind speed.

INDUSTRIAL APPLICABILITY

The present invention can be used in the industrial fields related to the calculation of high-resolution three-dimensional wind numerical information in consideration of detailed topographic information calculated as high-resolution wind numerical data.

DESCRIPTION OF SYMBOLS

S100: Input of wind numerical data of operational local data assimilation prediction system
S200: Pre-processing process
S300: Roughness length adjustment
S400: Height correction
S500: Correction of subgrid-scale terrain drag effect
S600: Calculation of high-resolution wind numerical data

What is claimed is:

1. A method of calculating high-resolution three-dimensional wind numerical information considering detailed topographic information, the method performing, when wind numerical data of an operational (Local Data Assimilation Prediction System) LDAPS model is calculated (S100), a downscaling process based on the detailed topographic information using the wind numerical data as an input data, wherein
the downscaling process
performs a preprocessing process of converting a coordinate system and interpolating horizontal and vertical numerical data (S200),
performs a process of adjusting roughness length (S300), correcting height (S400), and correcting a subgrid-scale terrain drag effect (S500) on the basis of the detailed topographic information, and
finally generates data that has gone through each of the processes as high-resolution wind numerical data (S600),
wherein step S500 is a method of correcting vertical wind numerical data, wherein
the procedure is configured of calculating a subgrid-scale topographic roughness length, estimating attenuation of momentum using logarithmic wind distribution, and correcting the estimated attenuation of momentum, and
the sub-grid scale topographic roughness length is calculated considering high-resolution topographic height numerical data on the basis of a low-resolution grid size, and
the subgrid-scale topographic roughness length applies a roughness length relational formula calculated using a large eddy simulation model under ideal surface roughness conditions, and is defined as shown in Equation (e)

$$z_{0,SSO} = \alpha\sigma_h(1+S_k)^\beta \quad \text{Equation (e), wherein}$$

$\sigma_h$ and $S_k$ denote standard deviation and skewness of a sub-grid scale topographic height, respectively, and $\alpha$ and $\beta$ are constants obtained through a large eddy simulation, and wherein at step S500, the attenuation of momentum generated due to sub-grid scale topographic roughness is estimated by applying logarithmic wind speed distribution applied in the vegetation roughness correction, and is defined as shown in Equation (f)

$$f_D(z) = \frac{\Delta\bar{u}(z)}{\bar{u}(z)} = \frac{\ln(h_{ABL}/z_0)\ln(z/z_{0,local})}{\ln(h_{ABL}/z_{0,local})\ln(z/z_0)}, \quad \text{Equation (f)}$$

wherein
- $f_D(z)$ denotes a momentum attenuation rate at each height, $\bar{u}(z)$ means wind data at vertical height z at which vegetation roughness correction is performed, $\Delta\bar{u}(z)$ denotes a difference of logarithmic wind data applying vegetation roughness length and sub-grid scale topographic roughness, $z_{0,local}$ is calculated by the sum of the vegetation roughness length and the sub-grid scale topographic roughness, and means ground surface roughness of the wind data correction point, and $h_{ABL}$ means height of the atmospheric boundary layer, and is set as 3.5 $h_{ref}$ to reflect local topographic characteristics,
- the method further comprising performing weather prediction based on a predicted wind speed using the high-resolution wind numerical data (S600).

2. The method according to claim 1, wherein at step S100, the wind numerical data is defined as U wind and V wind expressed in the form of a two-dimensional vector, and is constructed using FORTRAN and Korn-shell languages based on an x86 Linux server.

3. The method according to claim 2, wherein input of the wind numerical data of the operational LDAPS model at step S100 is targeting numerical data of 1.5 km grid size generated in a pp format, and an execution process is largely configured of recognition of files produced according to prediction time of corresponding data, and input of related files.

4. The method according to claim 3, wherein interpolation is performed horizontally and vertically at step S200 after the coordinate system of the U wind and V wind fields of the operational LDAPS model is converted into an Arakawa-B grid,
- the horizontal interpolation process applies a distance-weighted bi-linear interpolation using a 2×2 operational LDAPS model including a target point, and
- the vertical interpolation process performs interpolation by applying a distance weight in the vertical direction in the same way as the horizontal interpolation.

5. The method according to claim 4, wherein at step S300, wind data is corrected by applying a vegetation roughness length calculated based on the detailed topographic information, and correction of the vegetation roughness length is performed through a formula as shown in Equation (a)

$$u_{RA}(z) = \frac{u_*}{k}\ln\left(\frac{z}{z_0}\right) = u(h_{RA})\frac{\ln(z/z_0)}{\ln(h_{RA}/z_0)}, \quad \text{Equation (a)}$$

wherein
- $u_{RA}(z)$ means wind data that has gone through roughness adjustment at vertical height z, $u^*$ is friction velocity, k is von Karman constant (0.4), z is a height at which wind correction is performed, $Z_0$ means a vegetation roughness length at a corresponding point, $u(h_{RA})$ denotes wind data of input data (operational LDAPS model), and $h_{RA}$ is a reference height for roughness adjustment, which means an upper end of vertical logarithmic distribution of wind.

6. The method according to claim 5, wherein step S400 is a process of correcting changes in wind generated due to a difference between the height of a model that generates the wind field and the actual height, and is performed on the basis of a linear theory assuming a neutral atmosphere on a terrain calculated at a high resolution, and the process is defined as shown in equation (b)

$$\Delta u_{HC}(z) = u(h_{HC})e^{-kz}\Delta H \quad \text{Equation (b), wherein}$$

$\Delta u_{HC}(z)$ means corrected wind data at vertical height z, $u(h_{HC})$ means wind of input data (operational LDAPS model) at a reference height $h_{HC}$ for height correction, k is a topographic wave number, and $\Delta H_{HC}$ denotes height difference between high-resolution topographic data and low-resolution topographic data at the same target point.

7. The method according to claim 6, wherein at step S400, the reference height $h_{HC}$ for height correction and the topographic wave number k input into equation (b) are defined as shown in equations (c) and (d), respectively, $$h_{HC} = \frac{1}{k} \quad \text{Equation (c)}$$

$$k = \pi\frac{A/S}{H/2}, \quad \text{Equation (d)}$$

wherein
- H/2 and A/S mean topographic peak height and topographic silhouette roughness length calculated from the high-resolution topographic data.

8. The method according to claim 1, wherein at step S500, vertical wind distribution $\bar{u}_{SSO}(z)$ applied with the sub-grid scale terrain drag effect is calculated as shown in equation (g)

$$\bar{u}_{SSO}(z) = \bar{u}(z)(1-f_D(z)) \quad \text{Equation (g).}$$

9. The method according to claim 8, wherein at step S600, the high-resolution wind numerical data is generated to be divided into Netcdf4 format files in a set directory for each prediction time, and variables generated in each file include U wind, V wind, and wind speed.

\* \* \* \* \*